July 19, 1966      B. E. STEWART      3,261,647
WHEELED ROD STRUCTURE
Filed Nov. 13, 1963
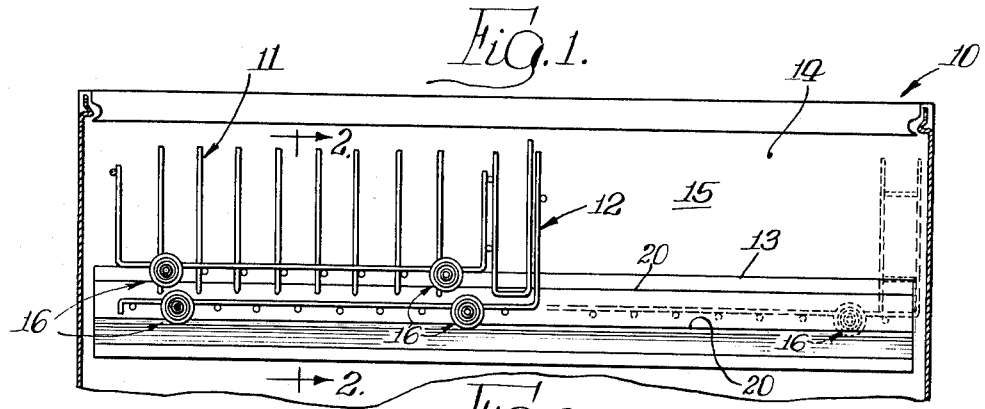
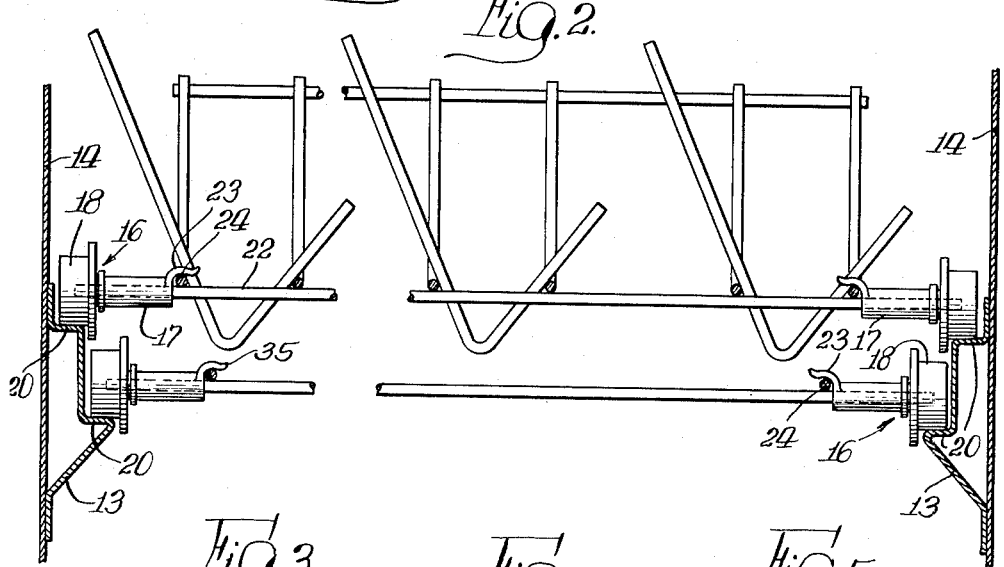
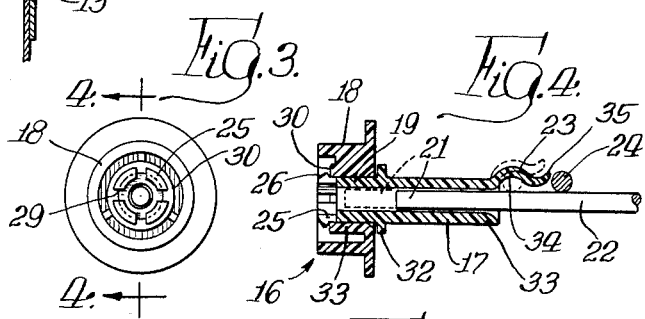
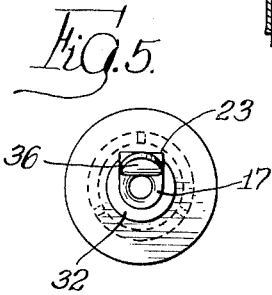
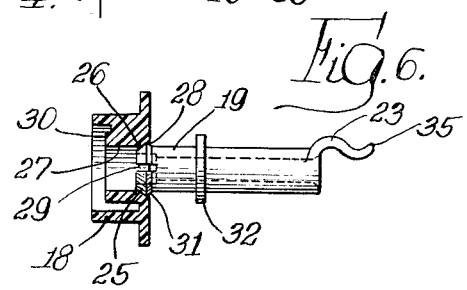
INVENTOR.
Bruce E. Stewart,
BY Hofgren, Wegner, Allen,
Stellman & McCord
Attys.

United States Patent Office 3,261,647
Patented July 19, 1966

3,261,647
WHEELED ROD STRUCTURE
Bruce E. Stewart, St. Paul, Minn., assignor to Whirlpool Corporation, a corporation of Delaware
Filed Nov. 13, 1963, Ser. No. 323,358
8 Claims. (Cl. 308—3.8)

This invention relates to wheel structures, and in particular to wheel structures for use in apparatus such as dishwashers.

In one well known form of dishwasher, a wire rack is provided with wheels riding on a pair of suitable tracks for horizontal rolling movement in the dishwasher space. The present invention comprehends an improved wheel assembly adapted for use in such dishwasher structures.

Thus, a principal feature of the present invention is the provision of a new and improved wheel assembly.

Another feature of the invention is the provision of such a wheel assembly which is extremely simple and economical in construction.

A further feature of the invention is the provision of such a wheel assembly arranged for simplified assembly and installation.

Still another feature of the invention is the provision of such a wheel assembly adapted for use with conventional rack structures such as provided in the known dishwashers, effectively eliminating the need for special mounting means in such rack structures.

A yet further feature of the invention is the provision of such wheel assembly arranged for facilitated assembly and installation without the use of tools.

Yet another feature of the invention is the provision of such a wheel assembly adapted for installation in a rack structure having a first rod having an outer end, and second rod extending transversely to the first rod inwardly of the outer end, the wheel assembly having a tubular axle formed of resilient plastic and having an outer end provided with a pair of shoulders spaced apart longitudinal of the axle, and an inner end, a wheel rotatively carried on the outer end of the axle, the wheel including a hub portion retained against axial movement between the shoulders, and a retainer tongue formed integrally with the axle on the inner end thereof, the tongue projecting inwardly from the axle and having a portion defining a semicylindrical notch opening substantially radially toward the axis of the axle, the tubular axle being constructed to fit on the outer end of the first rod and the tongue being constructed to engage the second rod with the second rod received in the notch to retain the axle against substantial axial movement on the first rod.

Other features and advantages of the invention will be apparent from the following description taken in connection with the accompanying drawing wherein:

FIGURE 1 is a fragmentary vertical section of a dishwasher including a pair of racks provided with a plurality of wheel assemblies embodying the invention;

FIGURE 2 is a fragmentary enlarged transverse section taken along the line 2—2 of FIGURE 1;

FIGURE 3 is an outer end view of one wheel assembly thereof;

FIGURE 4 is a diametric section taken substantially along the line 4—4 of FIGURE 3;

FIGURE 5 is an inner end view thereof; and

FIGURE 6 is a side elevation illustrating the assembly of the axle and wheel thereof.

In the exemplary embodiment of the invention as disclosed in the drawing, a dishwasher apparatus generally designated 10 is shown to comprise a pair of racks 11 and 12. The racks are movably carried on a pair of tracks 13 secured to the side walls 14 of the apparatus 10 for horizontal movement within the dishwasher space 15. In the illustrated embodiment, the rack 11 comprises a dish holding basket, and the rack 12 comprises a service shelf. As shown in FIGURE 1, the rack 12 may be disposed in the front portion of the space 15 with the basket 11 disposed in the rear portion, whereby the entire space 15 may be utilized for dish washing while yet the racks may each be disposed in the rear portion of the space when desired as during loading downwardly through space 15 into the subjacent space.

As indicated above, the invention comprehends an improved wheel assembly for providing rolling movement of the racks on the tracks 13. Referring now, more specifically, to FIGURES 2 through 6, the wheel assemblies generally designated 16 include an axle 17 and a wheel 18. The wheel 18 is rotatively mounted on the outer end 19 of the axle 17 and is disposed to roll along horizontal ledge portions 20 of the tracks 13, as seen in FIGURE 2. The axle 17 comprises a tubular member adapted to be received on the outer end 21 of a first wire or rod element 22 of the rack and includes a tongue portion, or retainer, 23 adapted to engage a second wire or rod element 24 of the rack extending transversely to the first wire 22. The wires 22 and 24 are wires conventionally provided in the rack structures, and, thus, the wheel assembly 16 is adapted for installation in the conventional rack structure without requiring the provision of special attaching structure therein.

More specifically, the axle 17 includes at its outer end a plurality of wheel engaging shoulders 25, each having an outer camming surface 26. The wheel 18 is provided with an axial bore 27 having at its inner end a frusto-conical camming surface 28 adapted to be engaged by the axle camming surface 26 when the axle is moved outwardly into bore 27. The shoulders 25 are spaced circumferentially apart to define slots 29 therebetween whereby the annular arrangement of the shoulders is radially constricted by the camming surface 26 to permit the shoulders to pass through the bore 27 to outwardly of an outer radial surface 30 of the wheel, as shown in FIGURE 4. The shoulders 25 are further defined by inner frusto-conical surfaces 31 engaging the wheel surface 30 to retain the wheel against outward movement on the axle. The axle further includes a radial flange 32 spaced inwardly from the shoulders 25 a distance substantially equal to the axial length of the hub portion 33 of the wheel 18, whereby the wheel is effectively rotatively movable, but axially fixed on the outer end 19 of the axle, as shown in FIGURE 4.

The axle may be formed of a resilient plastic to permit such mounting of the wheel on the outer end thereof by the resilient constriction and return of the shoulders to the position of FIGURE 4. As shown in FIGURE 4, the wheel may similarly be formed of plastic. The material of which the axle and wheel are formed preferably should provide a low coefficient of friction therebetween so as to permit facilitated rotation of the wheel on the axle.

The tongue 23 is provided on the inner end 33 of the axle 17 to extend longitudinally therefrom, i.e., inwardly in the direction of the axis of the axle. As shown in 5, the tongue preferably has a width substantially equal to the external diameter of the tubular axle. The tongue is generally S-shaped in longitudinal cross section taken in a radial plane including the axis of the axle. Thus, the tongue defines a hemicylindrical recess 34 having a length substantially equal to the outer diameter of the axle and extending transversely to the axis. The tip 35 of the tongue is outturned to define a camming surface 36 which when engaged by the wire 24 flexes the tongue outwardly, as shown in dotted lines in FIGURE 4, to permit the axle to move over the wire end 21 and allow the tongue to engage the wire 24 in the recess 34 thereof, as shown in FIGURE 2. As shown in FIGURE 4, the spacing of the recess 34 from the shoulders 25 of the outer end of the axle is slightly greater than the length of the wire end 21 outwardly of the wire 24 so that when the wheel assembly 16 is installed on the wire end 21 the wire end extends substantially fully the length of the axle for improved support of the wheel.

Thus, the retainer means defined by tongue 23 effectively precludes movement of the axle axially of rod 22 and rotatively about the rod. The resultant fixed mounting of the axle provides a positive support for the wheel 18 providing improved facilitated and accurate tracking of the wheel on the tracks 13.

Assembly of the wheel assembly 16 is extremely simple. The outer end 19 of the axle is manually urged into the hub bore 27 as shown in FIGURE 6, with the camming surface 26 of the axle shoulders 25 engaging the camming surface 28 on the wheel to constrict the shoulder portion radially inwardly and permit the movement thereof through the bore 27 to the outermost position shown in FIGURE 4. The resiliency of the axle causes the shoulders to spring outwardly to the position of FIGURE 4, thereby disposing surfaces 31 outwardly of the wheel surface 30 to cooperate with flange 32 in retaining the wheel against axial movement on the axle end 19.

The assembled wheel structure 16 is installed on the rack by manually urging the axle onto the end portion 21 of the rod 22 with the tongue 23 innermost, as shown in FIGURE 4. When the tongue portion 35 engages the transverse wire or rod 24, the tongue is cammed radially outwardly to permit the tongue to pass over the rod 24 until the rod is received within the notch or recess 34, as shown in dotted lines in FIGURE 4. The recess 34, being hemicylindrical, conforms to the cylindrical shape of the rod 24 and thereby effectively positively secures the axle to the rack. The rack is then set in place in the dishwasher space 15 with the wheels 18 riding on the track portions 20, as shown in FIGURE 2, to complete the installation.

The wheel assembly 16 is extremely simple and economical in construction effectively comprising only two parts which may be economically formed by molding from a suitable moldable plastic. The assembly of the structure is readily effected as discussed above and the installation thereof on the rack is similarly extremely simple. The wheel assembly, moreover, provides a positive mounting of the wheel on the rack without requiring the use of any tools. The wheel assembly is adapted for use with the conventional wires, or rods, 22 and 24 provided in such rack structures, and, thus, eliminates the need for special attaching means on the racks as required with other known wheel structures.

While I have shown and described one embodiment of my inventions, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. In a structure having a first rod having an outer end, and second rod extending transversely to the first rod adjacent said outer end, a wheel assembly comprising: a tubular axle having an outer end provided with a pair of shoulder spaced apart longitudinal of the axle, and an inner end; a wheel rotatively carried on said outer end of the axle, said wheel including a hub portion retained against substantial axial movement between said shoulders; and a retainer means carried on the inner end of said axle, said retainer means extending axially inwardly from said axle and having a portion defining a recess opening therefrom, said tubular axle being mounted on said outer end of the first rod and said retainer means engaging said second rod with said second rod received in said recess to substantially retain the axle against axial and rotative movement on said first rod, said retainer means being deflectable to permit selective movement of said axle axially inwardly and outwardly relative to said second rod for facilitated installation and removal of said wheel assembly relative to said rods as desired.

2. In a structure having a first rod having an outer end, and second rod extending transversely to the first rod adjacent said outer end, a wheel assembly comprising: a tubular axle having an outer end provided with a pair of shoulders spaced apart longitudinal of the axle, and an inner end; a wheel rotatively carried on said outer end of the axle, said wheel including a hub portion retained against substantial axial movement between said shoulders; and a resilient retainer tongue carried on the inner end of said axle, said tongue projecting axially inwardly from said axle and having a portion defining a recess opening substantially radially to the axis of said axle, said tubular axle being mounted on said outer end of the first rod and said tongue engaging said second rod with said second rod received in said recess to substantially retain the axle against axial and rotative movement on said first rod.

3. The wheel assembly of claim 2 wherein said outer end of the axle is split to permit a radial constriction thereof permitting the passing of one of said shoulders axially through the wheel.

4. The wheel assembly of claim 2 wherein said tongue is provided with an inner end portion having a camming surface arranged to deflect the tongue radially relative to said first rod axis as the axle is moved onto said first rod thereby to guide the tongue to engage said second rod in the recess thereof.

5. The wheel assembly of claim 2 wherein said tongue is substantially rectilinear in all radial planes of said first rod adjacent thereto and has a width substantially equal to the outside diameter of said axle.

6. The wheel assembly of claim 2 wherein said recess is substantially hemicylindrical.

7. The wheel assembly of claim 2 wherein said tongue is substantially S-shaped in longitudinal section.

8. In a dishwasher rack structure having a first rod having an outer end, and second rod extending transversely to the first rod inwardly of said outer end, a wheel assembly comprising: a tubular axle formed of resilient plastic and having an outer end provided with a pair of shoulders spaced apart longitudinal of the axle, and an inner end; a wheel rotatively carried on said outer end of the axle, said wheel including a hub portion retained against axial movement between said shoulders; and a retainer tongue formed integrally with said axle on the inner end thereof, said tongue projecting axially inwardly from said axle and having a portion defining a hemicylindrical notch opening substantially radially toward the axis of said axle, said tubular axle being mounted on said outer end of the first rod and said tongue yieldingly engaging said second rod with said second rod received in said notch to retain the axle substantially against axial and rotative movement on said first rod.

References Cited by the Examiner

UNITED STATES PATENTS

| | | | |
|---|---|---|---|
| 1,188,337 | 6/1916 | Siebert | 301—121 |
| 1,567,638 | 12/1925 | Dean | 307—134 X |
| 2,724,867 | 11/1955 | Smith | 308—15 X |
| 2,928,701 | 3/1960 | Ferdig. | |
| 3,107,947 | 10/1963 | Hulterstrum | 308—18 X |

DAVID J. WILLIAMOWSKY, *Primary Examiner.*

DON A. WAITE, *Examiner.*

L. L. JOHNSON, *Assistant Examiner.*